(12) United States Patent
Zhong et al.

(10) Patent No.: US 11,336,217 B2
(45) Date of Patent: May 17, 2022

(54) METHOD FOR REDUCING NOISE OF A SWITCHED RELUCTANCE MOTOR BASED ON ADJUSTING A PWM CARRIER FREQUENCY

(71) Applicants: CSMC TECHNOLOGIES FAB2 CO., LTD., Wuxi New District (CN); SOUTHEAST UNIVERSITY, Xuanwu District Nanjing (CN)

(72) Inventors: Rui Zhong, Wuxi New District (CN); Mingshu Zhang, Wuxi New District (CN); Sen Zhang, Wuxi New District (CN); Jinyu Xiao, Wuxi New District (CN); Wei Su, Wuxi New District (CN); Weifeng Sun, Wuxi New District (CN); Longxing Shi, Wuxi New District (CN)

(73) Assignees: CSMC TECHNOLOGIES FAB2 CO., LTD., Wuxi New District (CN); SOUTHEAST UNIVERSITY, Xuanwu District Nanjing (CN)

( * ) Notice: Subject to any disclaimer, the term of this patent is extended or adjusted under 35 U.S.C. 154(b) by 0 days.

(21) Appl. No.: 16/958,868

(22) PCT Filed: Dec. 29, 2018

(86) PCT No.: PCT/CN2018/125523
§ 371 (c)(1),
(2) Date: Jun. 29, 2020

(87) PCT Pub. No.: WO2019/129273
PCT Pub. Date: Jul. 4, 2019

(65) Prior Publication Data
US 2020/0343845 A1   Oct. 29, 2020

(30) Foreign Application Priority Data
Dec. 29, 2017  (CN) .......................... 201711476370.2

(51) Int. Cl.
*H02P 25/08* (2016.01)
*H02P 23/04* (2006.01)

(52) U.S. Cl.
CPC .............. *H02P 25/08* (2013.01); *H02P 23/04* (2013.01)

(58) Field of Classification Search
CPC ........ H02P 25/08; H02P 27/085; H02P 23/04; H02P 27/08; H02P 6/28; H02P 29/50; H02P 24/50
See application file for complete search history.

(56) References Cited

U.S. PATENT DOCUMENTS 5,461,295 A  * 10/1995 Horst ...................... H02P 25/08
                                                      318/400.05
2017/0250701 A1   8/2017 Hiroshima et al.
(Continued)

FOREIGN PATENT DOCUMENTS

| CN | 106059443 A | 10/2016 |
| CN | 106849832 A | 6/2017 |

(Continued)

OTHER PUBLICATIONS

International Search Report, and English Translation thereof, for International Application No. PCT/CN2018/125523, dated Apr. 3, 2019 (4 pages).
(Continued)

*Primary Examiner* — Karen Masih
(74) *Attorney, Agent, or Firm* — Kagan Binder, PLLC (57) ABSTRACT

A method and an apparatus for reducing noise of a switched reluctance motor, includes: supplying a PWM signal as a driving signal to a driving circuit of a switched reluctance motor; and varying a carrier frequency of the PWM signal as an operation period of the switched reluctance motor varies; if the switched reluctance motor changes phase,
(Continued)

determining that the operation period of the switched reluctance motor varies.

17 Claims, 7 Drawing Sheets

(56) References Cited

U.S. PATENT DOCUMENTS

2020/0328689 A1   10/2020  Xu et al.
2020/0343810 A1   10/2020  Xu et al.

FOREIGN PATENT DOCUMENTS

| JP | 4135132 B2 * | 8/2008 |
| JP | 2013055865 A | 3/2013 |
| WO | 2019129270 A1 | 7/2019 |
| WO | 2019129279 A1 | 7/2019 |

OTHER PUBLICATIONS

Gou et al, "Origin of Resonance Noise and Analysis of Randomising Turn-On Angle Method in Switched Reluctance Motor", JET Electric Power Applications, vol. 11, No. 7, ISSN: 1751-8660, pp. 1324-1332, Aug. 3, 2017, (9 pages).
Unpublished U.S. Appl. No. 16/959,015, filed Jun. 29, 2020.
Unpublished U.S. Appl. No. 16/915,524, filed Jun. 29, 2020.

* cited by examiner

METHOD FOR REDUCING NOISE OF A SWITCHED RELUCTANCE MOTOR BASED ON ADJUSTING A PWM CARRIER FREQUENCY

TECHNICAL FIELD

The present disclosure relates to the technical filed of motor, and more particularly relates to a method and an apparatus for reducing noise of a switched reluctance motor (SRM for short), a control system for a switched reluctance motor, one or more non-volatile readable storage media storing computer readable instructions and a method for reducing noise of a switched reluctance motor based on adjusting a PWM carrier frequency.

BACKGROUND

A switched reluctance motor plays a more and more important role in motor driving system, but due to its double salient pole structure and discontinuous coil excitation mode of the switched reluctance motor, the noise generated during an operation process of the switched reluctance motor is larger than that of a conventional motor. This is because that the electromagnetic force generated by the excitation of a stator winding during a phase changing will vary fiercely, and result in the radial electromagnetic force also vary fiercely, which make the stator deform and vibrate. Especially when a frequency contained in the radial electromagnetic force coincides with a natural frequency of the stator, the vibration of the stator becomes more serious, which may cause more serious noise, and further restrict the application of the switched reluctance motor in the field of low noise.

SUMMARY

According to various embodiments of the present disclosure, a method and an apparatus for reducing noise of a switched reluctance motor, a control system for a switched reluctance motor, and one or more non-volatile readable storage media storing computer readable instructions are necessarily provided.

A method for reducing noise of a switched reluctance motor, includes: supplying a PWM signal as a driving signal to a driving circuit of a switched reluctance motor; and varying a carrier frequency of the PWM signal as an operation period of the switched reluctance motor varies; if the switched reluctance motor changes phase, determining that the operation period of the switched reluctance motor varies.

In addition, a method for reducing noise of a switched reluctance motor based on adjusting a PWM carrier frequency is also provided. The method includes: transmitting a speed-adjusting signal obtained by a speed-adjusting handle, a gear signal obtained by a gear switch, a phase current signal of the switched reluctance motor detected by a sampling resistance, and a rotor position signal of the the switched reluctance motor detected by a Hall sensor to an external signal processing circuit; transmitting the processed signal to a microprocessor by the external signal processing circuit; outputting a PWM signal with the the calculated carrier frequency and a duty ratio as a driving signal by the microprocessor, to a switched tube in a power converter of an asymmetric half-bridge circuit structure; controlling a speed-adjusting operation of the switched reluctance motor by the switched tube in the power converter.

At each period of the operation of the switched reluctance motor, in the case that the duty ratio of the PWM wave is guaranteed to be unchanged, linearly varying a PWM carrier frequency output by the microprocessor, such that a switched variation frequency of a power tube is unfixed; constantly varying the PWM carrier frequency output by the microprocessor to disturb an excitation periodicity, and thereby destroying a periodicity of an electromagnetic force, so as to avoid a resonance noise caused when a frequency spectrum component of the electromagnetic force coincides with a natural frequency of a stator.

One or more non-volatile readable storage media storing computer readable instructions are further provided. When the instructions executed by one or more processors, one or more processors are caused to perform the steps of the above-mentioned method for reducing noise of a switched reluctance motor and the above-mentioned method for reducing noise of a switched reluctance motor based on adjusting a PWM carrier frequency.

A control system for a switched reluctance motor is also provided, which includes: a driving circuit configured to drive the switched reluctance motor; and a microprocessor connected to the driving circuit and configured to supply a PWM signal as a driving signal to the driving circuit; change the carrier frequency of the PWM signal as an operation period of the switched reluctance motor varies, and determine that the operation period of the switched reluctance motor varies if the switched reluctance motor changes phase.

An apparatus for reducing noise of a switched reluctance motor is further provided, which includes: a PWM signal supplying module configured to supply a PWM signal as a driving signal to a driving circuit of the switched reluctance motor; and a carrier frequency varying module configured to vary the carrier frequency of the PWM signal as an operation period of the switched reluctance motor varies, wherein if the switched reluctance motor changes phase, it is determined that the operation period of the switched reluctance motor varies.

Details of one or more embodiments of the disclosure are set forth in the following drawings and description. Other features, objects and advantages of the disclosure will become apparent from the specification, drawings and claims.

BRIEF DESCRIPTION OF THE DRAWINGS

The above and other objects, features and advantages of the disclosure will become more apparent from the more detailed description of the preferred embodiments of the disclosure shown in the accompanying drawings. The same reference numerals throughout the drawings indicate the same parts and are not intentionally drawn to scale with actual dimensions, with the focus on illustrating the spirit of the disclosure.

DETAILED DESCRIPTION OF THE EMBODIMENTS

In order to facilitate an understanding of that present invention, the present invention will now be more fully described with reference to related drawings. Preferred embodiments of the present invention are shown in the drawings. However, the invention may be implemented in many different forms and is not limited to the embodiments described herein. Rather, the purpose of providing these embodiments is to make the disclosure of the present invention more thorough and complete.

Figure 1:
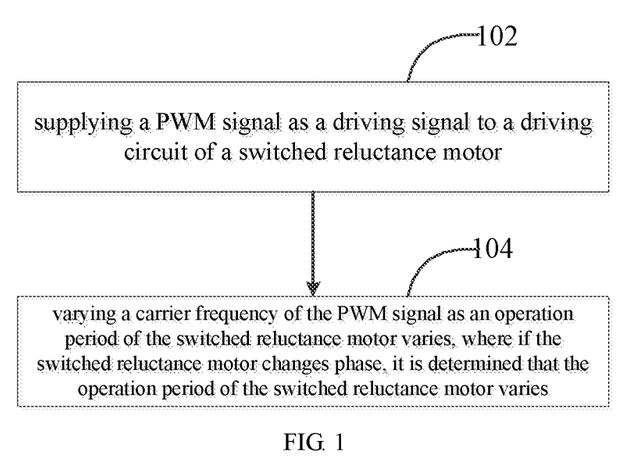
FIG. 1 is a flow chart of a method for reducing noise of a switched reluctance motor in one embodiment.

Unless otherwise defined, all technical and scientific terms used herein have the same meanings as generally understood by those skilled in the art belonging to the present invention. The terms used herein in the description of the invention are for purposes of describing specific embodiments only and are not intended to limit the invention. The present disclosure provides a method for reducing noise of a switched reluctance motor. FIG. 1 is a flow chart of a method for reducing noise of a switched reluctance motor in one embodiment. Referring to FIG. 1, the method for reducing noise of a switched reluctance motor includes steps 102 to 104:

In step 102, supplying a PWM signal, as a driving signal, to a driving circuit of the switched reluctance motor.

Figure 2:
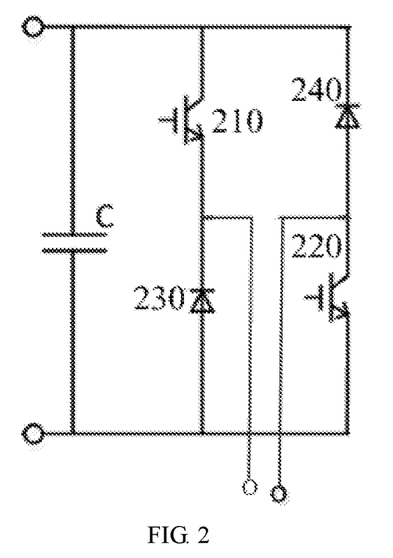
FIG. 2 is a schematic structure diagram of an asymmetric half-bridge circuit structure in one embodiment.

In one embodiment, the driving circuit of the switched reluctance motor includes more than two asymmetric half-bridge circuits. Each phase winding of the switched reluctance motor is powered by a corresponding asymmetric half-bridge circuit. With reference to FIG. 2, each asymmetric half-bridge circuit comprises a first power tube 210, a second power tube 220, a first freewheel diode 230 and a second freewheel diode 240. A power supply end of the first power tube 210 and a cathode of the second freewheel diode 240 are both connected to a positive of a power supply, an output end of the second power tube 220 and an anode of the first freewheel diode 230 are both connected to a negative of the power supply. An output end of the first power tube 210 is connected to a cathode of the first freewheel diode 230, and an anode of the second freewheel diode 240 is connected to a power supply end of the second power tube. Then the step of supplying the PWM signal as the driving signal to the driving circuit of the switched reluctance motor further includes supplying the PWM signal to a control end of each the first power tube 210.

Figure 3:
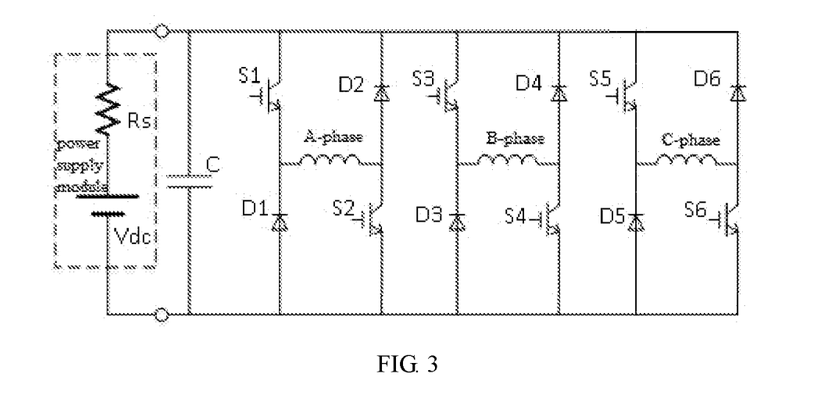
FIG. 3 is a schematic structure diagram of an asymmetric half-bridge circuit structure in a specific embodiment.

Specifically, the switched reluctance motor is a three-phase switched reluctance motor, and the stator windings of the three-phase switched reluctance motor are A-phase winding, B-phase winding, and C-phase winding, respectively. Referring to FIG. 3, the asymmetric half-bridge circuit for energizing the A-phase winding includes a power tube S1, a power tube S2, a freewheel diode D1 and a freewheel diode D2. The asymmetric half-bridge circuit for energizing the B-phase winding includes a power tube S3, a power tube S4, a freewheel diode D3 and a freewheel diode D4. The asymmetric half-bridge circuit for energizing the C-phase winding includes a power tube S5, a power tube S6, a freewheel diode D5 and a freewheel diode D6. In FIG. 3, an inductance L1, an inductance L2 and an inductance L3 are simplified model of the three-phase switched reluctance motor. The power supply end of the power tube S1, the power supply end of the power tube S3, the power supply end of the power tube S5, the cathode of the freewheel diode D2, the cathode of the freewheel diode D4, and the cathode of the freewheel diode D6 are all connected to the positive of the power supply, and are all connected to one end of a DC bus capacitor C. The anode of the freewheel diode D1, the anode of the freewheel diode D3, the anode of the freewheel diode D5, the output end of the power tube S2, the output end of the power tube S4, and the output end of the power tube S6 are all connected to the negative of the power supply, and are all connected to the other end of the DC bus capacitor C. The output end of the power tube S1 is connected to the cathode of the freewheel diode D1, the output end of the power tube S3 is connected to the cathode of the freewheel diode D3, and the output end of the power tube S5 is connected to the cathode of the freewheel diode D5. The power supply end of the power tube S2 is connected to the anode of the freewheel diode D2. The switching control signal without the PWM signal is provided to the power tube S2, the power tube S4, and the power tube S6, while the PWM signal is provided to the power tube S1, the power tube S3 and the power tube S5 in which a carrier frequency of the PWM signal varies over time.

In step 104, varying the carrier frequency of the PWM signal as an operation period of the switched reluctance motor varies, in which the operation period of the switched reluctance motor is determined to be varied if the switched reluctance motor changes phase.

In one embodiment, the step of varying the carrier frequency of the PWM signal as an operation period of the switched reluctance motor varies includes: linearly varying the carrier frequency of the PWM signal as the operation period of the switched reluctance motor varies.

Specifically, the step of supplying the PWM signal as the driving signal to the driving circuit of the switched reluctance motor includes: supplying the PWM signal with an initial carrier frequency to the driving circuit of the switched reluctance motor. The step of linearly varying the carrier frequency of the PWM signal as the operation period of the switched reluctance motor varies includes: if an offset amount of the carrier frequency of the PWM signal offset from the initial carrier frequency is detected to meet a preset maximum offset amount, varying, in a way of reversely linearly varying, the carrier frequency of the PWM signal in a subsequent operation period.

For example, the carrier frequency of the PWM signal and the initial carrier frequency satisfy the following relationship:

$$f_{PWM} = f_0 + m * \Delta f;$$

Where $f_{PWM}$ is the carrier frequency of the PWM signal in an operation process of the switched reluctance motor, m is a variation coefficient of the carrier frequency and the value of m is from 0, ±1, ±2, ..., ±n. As the rotating of a rotor of the switched reluctance motor, the value of m varies linearly along with the increasing of the number of periods.

The preset maximum offset amount is $n*\Delta f$. When the value of m linearly increases up to the maximum value n, the value of m becomes to decrease linearly; and when the value of m decrease to the minimum value −n, the value of m becomes to increase linearly.

In the present embodiment, the carrier frequency of the PWM signal varies as the varying of the operation period, and the carrier frequency of the PWM signal is increased or decreased by a fixed value with the increasing of the number of motor operation periods. When the maximum value is reached, the carrier frequency of the PWM signal is decreased with the increasing of the number of the motor operation periods; and when the carrier frequency is decreased to the minimum value, the carrier frequency then increases again. By varying back and forth like this, the achieved effect is that the carrier frequency of the PWM signal linearly varies above and below a base frequency all the time.

Specifically, the step of varying the carrier frequency of the PWM signal as the operation period of the switched reluctance motor varies includes: keeping a duty ratio of the PWM signal unchanged, and as the operation period of the switched reluctance motor varies, varying the carrier frequency of the PWM signal. In the present embodiment, when the carrier frequency of the PWM signal is changed, the duty ratio of the PWM signal is not affected by the number of the operation periods. Namely the controls of the PWM carrier frequency and the duty ratio are mutually independent. When the carrier frequency of the PWM signal is changed, the performances of a rotation speed, a torque, an efficiency and the like of the switched reluctance motor are not affected.

In one embodiment, the step of varying the frequency of the PWM carrier of the driving signal over time includes: after detecting that the switched reluctance motor completes one operation period, determining that the switched reluctance motor enters a next operation period and changing the carrier frequency of the PWM signal in the next operation period.

In other embodiment, if the switched reluctance motor has not entered into the new operation period, the carrier frequency of the PWM signal is kept unchanged.

In one embodiment, the step of determining that the switched reluctance motor changes phase includes: if an axis of one salient pole of the switched reluctance motor is changed from being coincident with an axis of one a rotor salient pole to being coincident with an axis of the next rotor salient pole, determining that the switched reluctance motor changes phase.

Figure 4:
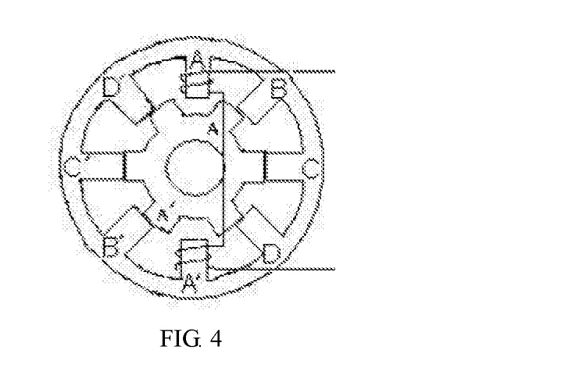
FIG. 4 is a schematic structure diagram of a four-phase 8/6 poles switched reluctance motor in one embodiment.

For example, in a four-phase 8/6 poles switched reluctance motor shown in FIG. 4, taking the C-phase as an example, an axis the stator salient pole coincides with an axis of the rotor salient pole, and when the rotor rotates by another 60 degrees, it will be that an axis of the next pair of the rotor salient poles coincides with this axis of the stator salient pole, which indicates that the operation period of the switched reluctance motor varies.

Further, in a specific embodiment, the method for reducing noise of a switched reluctance motor in an embodiment of the present application further includes a step of based on the number of the rotor salient poles of the switched reluctance motor, calculating that when the switched reluctance motor completes one operation period, a corresponding reference angle to be rotated by the rotor of the switched reluctance motor. Specifically, the switched reluctance motor is a three-phase 12/8 poles switched reluctance motor, i.e. the number of rotor salient poles is 8 and thus the corresponding reference angle to be rotated by the rotor of the switched reluctance motor is 45° with the switched reluctance motor completing one operation period. Then, the step that if an axis of one stator salient pole of the switched reluctance motor is changed from coinciding with an axis of one rotor salient pole to coinciding with a next axis of one rotor salient pole, determining that the operation period of the switched reluctance motor changes, comprises: if detecting that the axis of one stator salient pole of the switched reluctance motor coincides with the axis of one rotor salient pole, and afterwards detecting that an angle rotated by the rotor of the switched reluctance motor reaches the reference angle as the switched reluctance motor continues to operate, determining that the switched reluctance motor enters a new operation period. After it is determined that the switched reluctance motor enters the new operation period, the carrier frequency of the PWM signal is varied.

Figure 5:
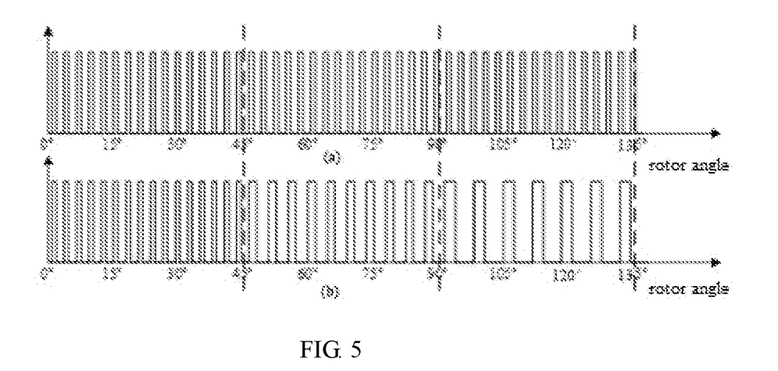
FIG. 5 is a waveform chart of an unmodulated PWM signal in one embodiment and a waveform chart of a modulated PWM signal by a method of present embodiment.

For example, FIG. 5 (a) shows a waveform of an unmodulated PWM signal and FIG. 5 (b) shows a waveform of a modulated PWM signal by using a method of present embodiment. Due to the controlled object is the three-phase 12/8 poles switched reluctance motor, it is known through calculation that, when the switched reluctance motor completes one operation period, the rotor of the switched reluctance motor should correspondingly rotate by an angle of 45° which is a mechanical angle. It can be seen from FIG. 5 that, the carrier frequency of the unmodulated PWM signal remains unchanged, and the carrier frequency of the waveform modulated varies once per the rotor rotating 45°.

Figure 6:
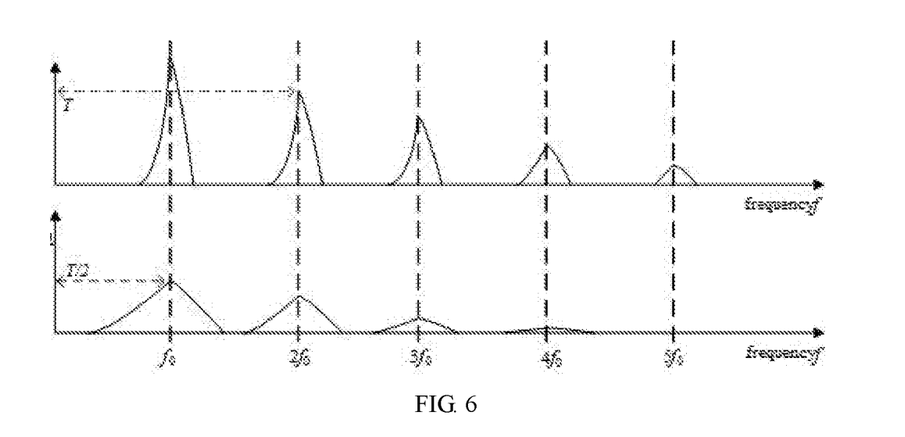
FIG. 6 is a spectrum comparison diagram of radial electromagnetic force utilizing an unmodulated PWM signal in one embodiment and a modulated PWM signal utilizing a method of the present embodiment.

FIG. 6 shows a spectrum contrast diagram of the radial electromagnetic force utilizing an unmodulated PWM signal and a modulated PWM signal using the method of the present embodiment. By utilizing the unmodulated PWM signal, the PWM carrier frequency remains unchanged. When the motor operates normally at steady speed, the three phases are excited alternately, and the frequency spectrum component of radial electromagnetic force generated by each phase is fixed. If a component, which coincides with the natural frequency of the stator, is contained, a resonance is caused and noise occurs. However, the carrier frequency of the modulated PWM signal using the method of the present embodiment is not fixed, that is the switched frequency is not fixed, so that the frequency spectrum component of the electromagnetic force constantly change, and in general makes a frequency domain of the radial electromagnetic force wider. An amplitude of the radial electromagnetic force at the extreme value accordingly decreases, thereby decreasing a resonance amplitude and reducing the noise of the switched reluctance motor.

In an embodiment of the present application, the method for reducing noise of a switched reluctance motor further includes the steps of obtaining a speed-adjusting signal of the speed-adjusting handle of the switched reluctance motor, a gear signal of a gear switch of the switched reluctance motor, a phase current signal of the switched reluctance motor, and a rotor position signal of the switched reluctance motor; determining a duty ratio of the PWM signal based on the speed-adjusting signal and the gear signal, and compensating the PWM signal based on the phase current signal of the switched reluctance motor; and calculating the carrier frequency of the PWM signal based on the rotor position signal of the switched reluctance motor, then the carrier frequency of the PWM signal is changed according to the calculated carrier frequency.

In the present embodiment, the PWM signal is compensated by utilizing the feedback phase current signal of the switched reluctance motor, which is beneficial to making the phase current signal output by the driving circuit reach an expected value.

According to the method for reducing noise of a switched reluctance motor in an embodiment of the present application, when the switched reluctance motor changes phase, it is determined that the switched reluctance motor enters the new operation period. Then the PWM carrier frequency is changed to destroy the periodicity of the electromagnetic force generated by excitation during phase change. The overall noise of the switched reluctance motor can be reduced accordingly. The varying of the PWM carrier frequency also decreases a probability of the frequency of the radial electromagnetic force coinciding with the natural frequency of the stator, thereby reducing the probability of the resonance producing noise.

In an embodiment of the present application, a method for reducing noise of a switched reluctance motor based on adjusting a PWM carrier frequency is further provided, which includes transmitting a speed-adjusting signal obtained by a speed-adjusting handle, a gear signal obtained by a gear switch, a phase current signal of the switched reluctance motor detected by a sampling resistance, and a rotor position signal of the the switched reluctance motor detected by a Hall sensor to an external signal processing circuit; transmitting the processed signal to a microprocessor by the external signal processing circuit; outputting by the microprocessor a PWM signal of the calculated carrier frequency and a duty ratio as a driving signal, to a switched tube in a power converter of an asymmetric half-bridge circuit structure; controlling a speed-adjusting operation of the switched reluctance motor by the switched tube in the power converter.

At each period of the operation of the switched reluctance motor, in the case that the duty ratio of the PWM wave is guaranteed to be unchanged, the PWM carrier frequency output by the microprocessor is linearly changed such that a switching variation frequency of a power tube is unfixed. By constantly changing the carrier frequency of the the PWM output by the microprocessor, an excitation periodicity is disturbed to destroy a periodicity of an electromagnetic force, so as to avoid a resonance noise caused by a frequency spectrum component of the electromagnetic force coincides with a natural frequency of a stator.

Specifically, 1) before the switched reluctance motor operates, setting an initial frequency $f_0$ of the PWM carrier frequency, a unit offset amount $\Delta f$ of the carrier frequency, and a maximum offset amount $n*\Delta f$, where $\Delta f$ is a variation amount of the carrier frequency at each period of the operation of the motor, and $n*\Delta f$ is the maximum offset value of the PWM carrier frequency deviated from a base frequency $f_0$;

2) in operating of the switched reluctance motor, calculating a motor rotor position $\theta_r$ by the microprocessor based on the position signal obtained by a HALL position signal sensor, and when the motor rotates to where a rotor salient pole coincides with a stator salient pole, i.e. the rotor position $\theta_0$ is equal to $\theta_0$ ($\theta_r=\theta_0$), varying the PWM carrier frequency, and the rotor position $\theta_r$ periodically varying as the operation of the motor, with the following calculation formula:

$$f_{PWM}=f_0+m*\Delta f;$$

Where $f_{PWM}$ is the carrier frequency in an actual operation of PWM, and m is a variation coefficient of the carrier frequency and its range is 0, ±1, ±2 ... ±n; and with the motor rotating, the value of m linearly varies with the increasing of the number of the periods number; the value of m would reversely linearly varies when m takes the maximum value n or the minimum value −n;

3) based on a comparison of a mechanical angle which corresponds to one period of the actually controlled switched reluctance motor and a mechanical rotating angle by the rotor, determining whether the motor enters a new period; if the new period is entered, updating the PWM carrier frequency in a specific way of varying: on the assumption of first having the PWM carrier frequency increase with the increasing of the motor periods, increasing the PWM carrier frequency by one frequency unit offset amount $\Delta f$ based on the current PWM carrier frequency, when the PWM carrier frequency increases to the maximum value ($f_0+n*\Delta f$), decreasing the PWM carrier frequency as the motor period increases and the value of each decreasing is also one frequency unit offset amount $\Delta f$, until decreasing to the minimum value ($f_0-n*\Delta f$), and increasing the PWM carrier frequency again as the motor period increases, thus cycling. If the motor has not entered the new period, keeping the PWM carrier frequency unchanged;

4) outputting, by the microprocessor, the PWM signal with the calculated carrier frequency and the duty ratio as the driving signal, to the power converter of the asymmetric half-bridge circuit structure; on the basis of an operation result of a control program, outputting corresponding switching signals of upper and lower power tubes, where a switched control signal of the upper power tube is the PWM signal output and modulated by the microprocessor, and a control signal of the lower power tube is a switching control signal without PWM and output directly by the microprocessor.

Specifically, the microprocessor MCU uses a STM32F103B as a main controlling chip, a constantan wire is used as a sampling resistance for sampling the phase current of the motor, and a a pulse type HALL sensor US4881KUA is used for detecting the position of the motor rotor.

The method for reducing noise of a switched reluctance motor based on adjusting of a PWM carrier frequency as above described may be applied to a controller of the switched reluctance motor to destroy the periodicity of the electromagnetic force generated by excitation, so as to avoid the resonance noise generated when the frequency spectrum component of the electromagnetic force coincides with the natural frequency of the stator, and thereby reducing the overall noise of the motor. The PWM carrier frequency is controlled by the microprocessor to vary with the operation periods of the motor. As the number of the motor operation periods increase, the PWM carrier frequency is increased or decreased by a fixed value. For example, first have the PWM carrier frequency to increase as the number of the motor operation periods increases, and when the PWM carrier frequency reaches the maximum value, it decreases with the increasing of the number of the motor operation periods, and then, when the PWM carrier frequency decreases to the minimum value, it increases again. By changing the PWM carrier frequency in such a back and forth way, the PWM carrier frequency is always linearly varies above and below the base frequency. When the PWM carrier frequency is varied, the duty ratio of the PWM signal is not affected by the number of the motor operation periods, i.e., the controlling of the duty ratio is independent of the PWM carrier frequency. When the PWM carrier frequency is varied, the performances of the the rotating speed, the torque, the efficiency and the like of the switched reluctance motor are not affected, and the noise in operating of the motor is apparently decreased. The method for reducing noise of the switched reluctance motor based on adjusting of the PWM carrier frequency as discussed above can be widely applied for there are not too much requirements for the rotating speed and load. The technical scheme can be implemented easily for the scheme is simple without needing a hardware auxiliary circuit.

Figure 7:
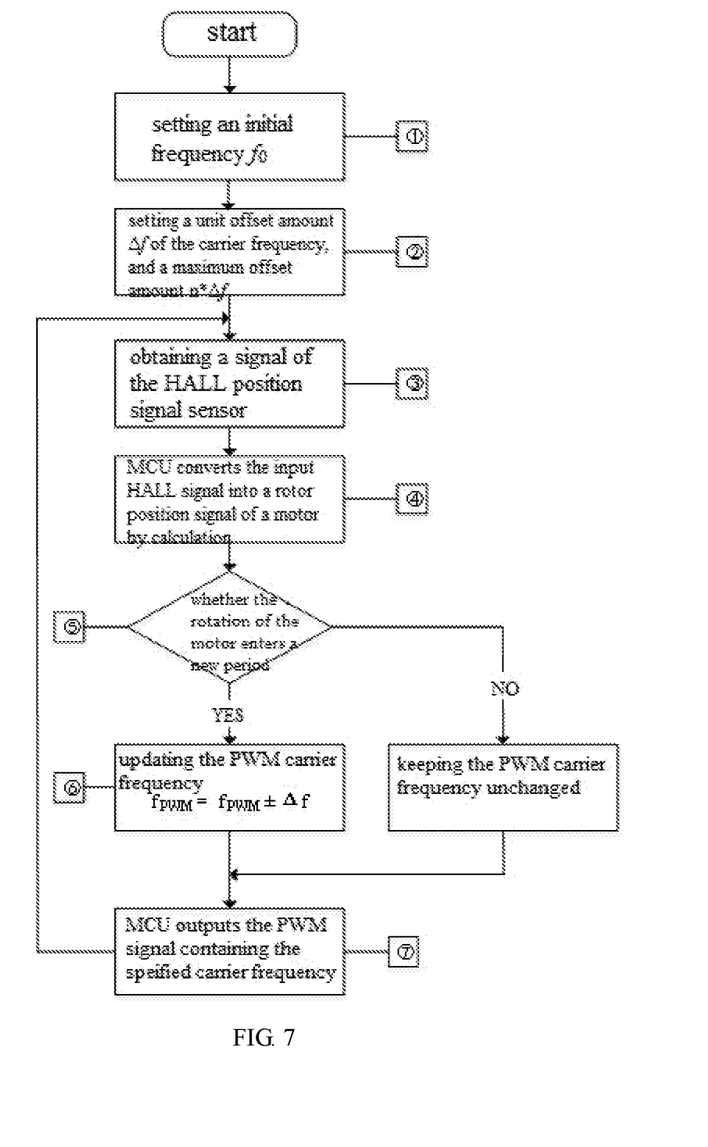
FIG. 7 is an operation flow chart of a method for reducing noise of a switched reluctance motor based on adjusting a PWM carrier frequency in a specific embodiment.

Specifically, the operation flow chart of the method for reducing noise of a switched reluctance motor based on adjusting a PWM carrier frequency is shown in FIG. 7. As shown, an initial frequency $f_0$ (①) of the PWM carrier frequency, a unit offset amount $\Delta f$ of the carrier frequency, and a maximum offset amount $n*\Delta f$ (②) are set before the the switched reluctance motor operates, in which. $\Delta f$ is a variation amount of the carrier frequency at each period of the operation of the motor, and $n*\Delta f$ is the maximum offset value of the PWM carrier frequency deviated from the base frequency $f_0$. The microprocessor determines the rotor position signal of the switched reluctance motor by means of the HALL signal transmitted by the HALL position signal sensor, and converts the HALL signal input into the microprocessor to motor rotor position signal (③ ④) after calculating. Based on a comparison of a mechanical angle which corresponds to one period of the actually controlled switched reluctance motor and a mechanical rotating angle by the rotor, it is determined whether the motor enters a new period (⑤). If the motor enters the new period, then the PWM carrier frequency is updated in a specific variation mode: it is assumed to have the PWM carrier frequency increases with the increasing of the motor period. First the PWM carrier frequency is increased by one frequency unit offset amount $\Delta f$ based on the current PWM carrier frequency. When the PWM carrier frequency increases to the maximum value ($f_0+n*\Delta f$), the PWM carrier frequency then decreases with the increasing of the motor period in which the value of each decrease is also one frequency unit offset amount $\Delta f$. When decreasing to the minimum value ($f_0-n*\Delta f$), the PWM carrier frequency would increases again with the increasing of the motor period, thus cycling, and so on. If the motor has not entered the new period, the PWM carrier frequency is kept unchanged (⑥). At last, the microprocessor outputs the PWM signal with the calculated carrier frequency and the duty ratio as the driving signal (⑦).

Figure 8:
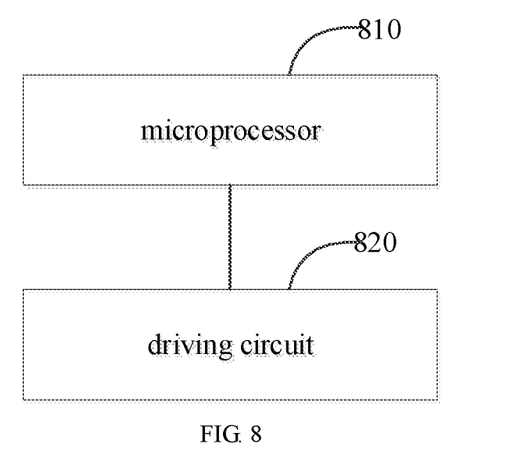
FIG. 8 is a block diagram of a control system for a switched reluctance motor in one embodiment.

The embodiment of the present application further provides a control system for a switched reluctance motor. Referring to FIG. 8, the control system includes: a driving circuit 810 and a microprocessor 820. The driving circuit 810 is configured to drive the switched reluctance motor. The microprocessor 820 connected to the driving circuit 810 is configured to provide the PWM signal as the driving signal to the driving circuit, and as the variation of the operation period of the switched reluctance motor, to change the carrier frequency of the PWM signal. If the switched reluctance motor changes phased, it is determined that the operation period of the switched reluctance motor varies.

Figure 9:
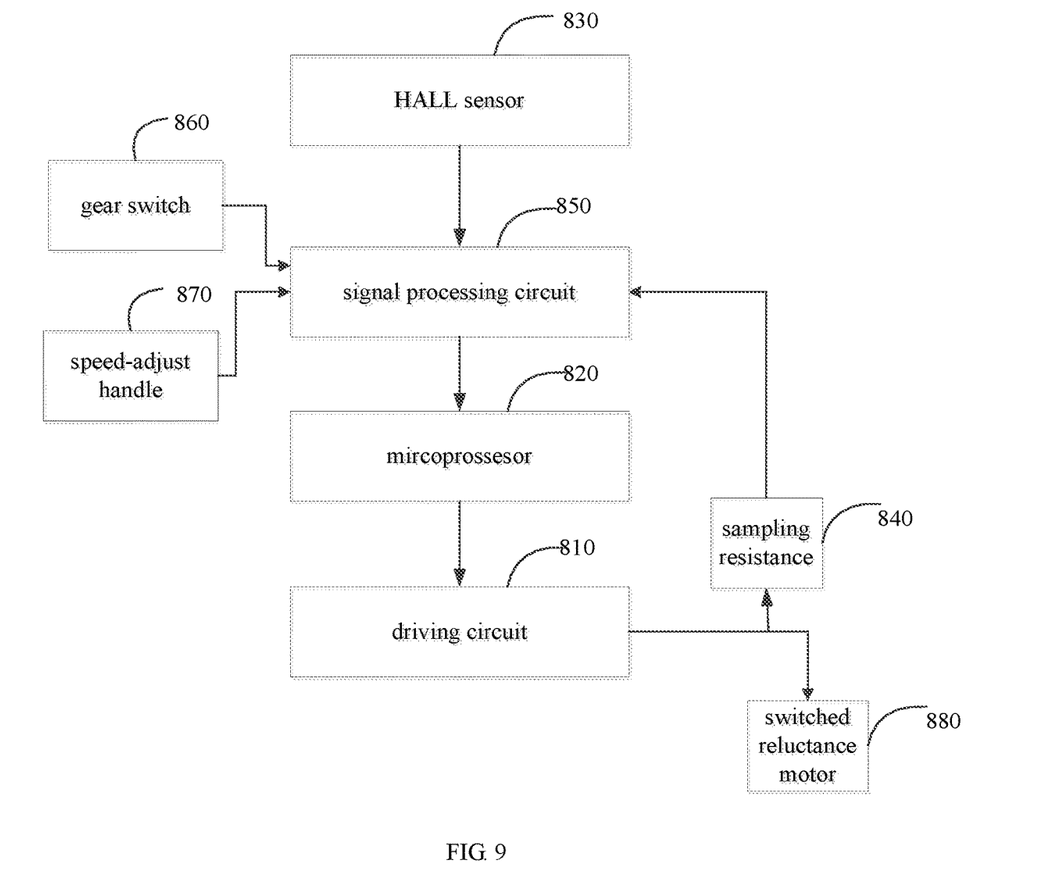
FIG. 9 is a block diagram of a control system for a switched reluctance motor in another embodiment.

In one embodiment, referring to FIG. 9, the control system for the switched reluctance motor in an embodiment of the present application also includes a HALL sensor 830, a sampling resistance 840, and a signal processing circuit 850 configured to connect to a speed-adjusting handle 860 of the switched reluctance motor 880 and a gear switch 870. The HALL sensor 830 is configured to detect the rotor position signal of the switched reluctance motor, and is set at the switched reluctance motor 830. The sampling resistance 840 is connected to an input end of the switched reluctance motor 880. The signal processing circuit 850 is further connected to the HALL sensor 830 and the sampling resistance 840, respectively. The signal processing circuit 850 is configured to sample a phase current signal of the switched reluctance motor 880 through the sampling resistance 830. The signal processing circuit 850, based on the speed-adjusting signal and the gear signal, determines a duty ratio of the PWM signal, and compensates the PWM signal based on the phase current signal. Based on the rotor position signal, the carrier frequency of the PWM signal is calculated, and based on the calculated carrier frequency, the carrier frequency of the PWM signal is changed. Specifically, based on the rotor position signal, it may be determined that whether the switched reluctance motor 880 has completed one motion period.

Specifically, the driving circuit 810 includes more than two asymmetric half-bridge circuits. Each phase winding of the switched reluctance motor is powered by the corresponding asymmetric half-bridge circuit. Referring to FIG. 2, each asymmetric half-bridge circuit includes a first power tube 210, a second power tube 220, a first freewheel diode 230 and a second freewheel diode 240. The power supply end of the first power tube 210 and the cathode of the second freewheel diode 240 are both connected to the positive of the power supply. An output end of the second power tube 220 and the anode of the first freewheel diode 230 are both connected to the negative of the anode of the power supply. The output end of the first power tube 210 is connected to the cathode of the first freewheel diode 230, and the anode of the second freewheel diode 240 is connected to the power supply end of the second power tube. Then the following step of supplying a PWM signal as a driving signal to a driving circuit of a switched reluctance motor includes: supplying the PWM signal to a control end of each first power tube 210.

Specifically, the HALL sensor 830 may be the impulse type HALL sensor. The microprocessor 820 may use STM32F103B as main control chip. The sampling resistance 840 may be constantan wire.

Figure 10:
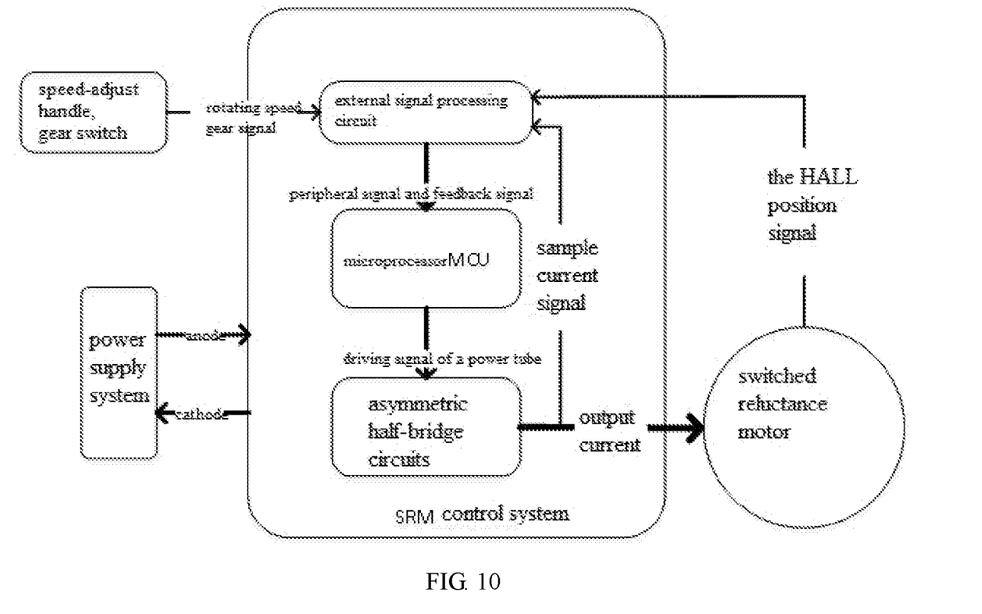
FIG. 10 is a block diagram of a corresponding switched reluctance motor control system in a specific embodiment.

FIG. 10 is a block diagram of the control system for a corresponding switched reluctance motor in an embodiment of the present application. In FIG. 10, the microprocessor MCU using STM32F103B as a main control chip receives a peripheral signal, a motor rotor position signal and a sampled phase current signal, and outputs a driving signal of a power MOS tube under the control of the control program of the switched reluctance motor. The work process of the whole control system is as follows: the speed-adjusting handle and the gear switch transmit the speed-adjusting signal and the gear signal to the external signal processing circuit, then the external processing circuit transmits a processed signal to the microprocessor. By controlling and calculating, the microprocessor outputs the power tube driving signal to a power converter to control the operation of the motor. In this application, the power converter is configured as the asymmetric half-bridge circuit structure. The microprocessor controls the operation of the motor with an adjustable speed by mainly a PWM mode. When normally working, the microprocessor generates the PWM waveform, in which the carrier frequency and the duty ratio of the PWM are both adjustable (the duty ratio is used to adjust the speed of the motor). Based on the operation result of the control program, the microprocessor outputs the switching signals for the corresponding upper and lower power tubes. The switching signal for the lower power tube is output directly by the microprocessor, and the switching signal of the upper power tube is output to the upper power tube by the microprocessor controls the PWM signal to be the switching signal or not to be the switching signal by the output controlling signal, and thus the turn-on time and the switching frequency of the upper power tube are directly influenced by adjusting the duty ratio and the carrier frequency of the PWM. The current sample uses the constantan wire on a control board as the sampling resistance to detect the phase current signal of the switched reluctance motor. The pulse style HALL sensor US4881KUA is used for position detecting to detect the rotor position of the switched reluctance motor. The phase current signal obtained by sampling and the position signal obtained are processed by a peripheral circuit of the microprocessor and then transmitted to the microprocessor. In FIG. 10, the power supply module usually uses, according to the condition of the electric vehicle industry, a DC power supply of 48V~72V.

FIG. 3 shows the schematic structure diagram of an asymmetric half-bridge circuit structure utilized by the power converter. In FIG. 3, the three inductances are simplified models of the three-phase switched reluctance motor. S1, S3 and S5 are the switching signals of the upper power tube of the power converter. S2, S4 and S6 are the switching signals of the lower power tube. C is a DC bus capacitor, and D1-D6 are the freewheel diodes. A turn-on signal for the upper power tube is the modulated PWM signal, and the switching signal for the lower power tube is without the PWM signal. The working process of the switched reluctance motor is divided to three stages of excitation, backflow and afterflow. Taking the A-phase as an example, at the excitation stage, S1 and S2 are both turned off, that is the upper power tube and the lower power tube are conducted through simultaneously. The power supply supplies energy to the A-phase, and the phase current starts from the power supply, and returns to the power supply through S1, the equivalent inductance of the motor and S2, to form a current loop. The equivalent inductance stores energy at this stage. When S1 closes and S2 opens, i.e., the upper power tube is turn-off and the lower power tube is conducted through, it is be in the afterflow stage at this time in which the stored energy in A-phase is used as the power supply, and the phase current returns to the A-phase through D2 and S1 to form a loop, and thus the phase current loss is small. When S1 and S2 are both turn off, that is the upper and lower power tubes are turn-off simultaneously, the phase current starts from the A-phase, and returns to the A-phase through D2, the power module and D1. At this time the motor is in the backflow state. Giving a specified excited sequence to the three-phase power tube may make the motor work in different states and smoothly operate and rotate. Without considering all kinds of losses, the power converter can also be equivalent to a switch-controlled voltage source.

In the control system for the switched reluctance motor in an embodiment of the present application, when the switched reluctance motor changes, the microprocessor 810 determines the switched reluctance motor enters the new operation period, and then changes the PWM carrier frequency, and destroy the periodicity of the electromagnetic force generated by excitation during the changing of phase, which is capable of reducing the overall noise of the switched reluctance motor. The varying of the PWM carrier frequency also decreases the probability that the frequency of the radial electromagnetic force coincides with the natural frequency of the stator, in order to reduce the probability generated by the resonance noise. The control system hardware of the switched reluctance motor in the embodiment of the application is simple to build.

Figure 11:
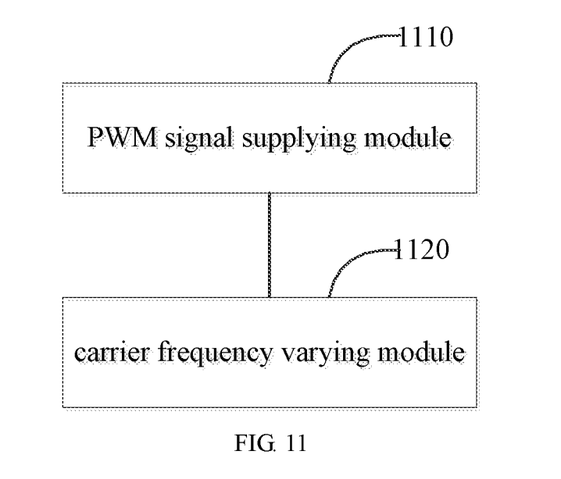
FIG. 11 is a block diagram of an apparatus for reducing noise of a switched reluctance motor in one embodiment.

Referring to FIG. 11, an apparatus for reducing noise of a switched reluctance motor is further provided, which includes: a PWM signal supplying module 1110, which is used to supply a PWM signal as a driving signal to a driving circuit of a switched reluctance motor; and a carrier frequency varying module 1120, which is used to vary a carrier frequency of the PWM signal as an operation period of the switched reluctance motor varies where if the switched reluctance motor changes phase, it is determined that the operation period of the switched reluctance motor varies.

The division of modules in the apparatus for reducing noise of the switched reluctance motor as mentioned above is just used for illustration. The apparatus for reducing noise of the switched reluctance motor can be divided into different modules in other embodiments so as to complete all or part functions of the apparatus for reducing noise of the switched reluctance motor as mentioned above.

The specific definition of the apparatus for reducing noise of the switched reluctance motor can be found in the above definition of the method for reducing noise of the switched reluctance motor, which will not be repeated here. Each module of the apparatus for reducing noise of the switched reluctance motor as described above may be implemented in whole or in part by software, hardware, and combinations thereof. The above described modules may, in hardware form, be embedded in or independent of the processor in the computer device, or may be stored in memory in the computer device in software form to facilitate the processor calls to perform the operations corresponding to the above-described modules.

One or more non-volatile readable storage media storing computer readable instructions is further provided.

In one embodiment, one or more non-volatile readable storage media storing computer readable instructions are provided. When the instructions are executed by one or more processors, the one or more processors are caused to perform the steps of the method for reducing noise of the switched reluctance motor according to any above embodiment, and perform the steps of the method for reducing noise of a switched reluctance motor based on adjusting a PWM carrier frequency according to any above embodiment.

The various technical features of the embodiments as described above may be arbitrarily combined. All possible combinations of the various technical features in the embodiments described above are not described in order to simplify the description; however, as long as there is no contradiction in the combination of these technical features, such combination shall be deemed to be the scope of this specification.

The examples described above represent only several embodiments of the invention, the description of which is more specific and detailed, but are not therefore to be construed as limiting the scope of the invention. It should be noted that several modifications and modifications may be made to those of ordinary skill in the art without departing from the inventive concept, which are within the scope of the invention. Therefore, the scope of protection of this invention patent shall be subject to the appended claims.

The invention claimed is:

1. A method for reducing noise of a switched reluctance motor based on adjusting a PWM carrier frequency, comprising:

transmitting a speed-adjusting signal obtained by a speed-adjusting handle, a gear signal obtained by a gear switch, a phase current signal of the switched reluctance motor detected by a sampling resistance, and a rotor position signal of the switched reluctance motor detected by a Hall sensor to an external signal processing circuit; transmitting a processed signal to a microprocessor by the external signal processing circuit; outputting by the microprocessor a PWM signal with a calculated carrier frequency and a duty ratio as a driving signal to a switched tube in a power converter of an asymmetric half-bridge circuit structure; controlling a speed-adjusting operation of the switched reluctance motor by the switched tube in the power converter;

at each period of an operation of the switched reluctance motor, linearly varying the PWM carrier frequency output by the microprocessor while maintaining the duty ratio of a PWM wave, such that a switching variation frequency of a power tube is unfixed; constantly changing the PWM carrier frequency output by the microprocessor to disturb an excitation periodicity.

2. The method for reducing noise of a switched reluctance motor based on adjusting a PWM carrier frequency of claim 1, further comprising following steps:

1) before the switched reluctance motor operates, setting an initial frequency $f_0$ of the PWM carrier frequency, a unit offset amount $\Delta f$ of the carrier frequency, and a maximum offset amount $n*\Delta f$ wherein $\Delta f$ is a variation amount of the carrier frequency at each period of the operation of the motor and $n*\Delta f$ is a maximum offset value of the PWM carrier frequency deviated from a base frequency $f_0$;

2) in operation of the switched reluctance motor, calculating a motor rotor position $\theta_r$ by the microprocessor based on a position signal obtained by a HALL position signal sensor; when the motor rotates until a rotor salient pole coincides with a stator salient pole, i.e., when the rotor position $\theta_r$ equals to $\theta_0$ ($\theta_r=\theta_0$), varying the PWM carrier frequency, and periodically varying the rotor position $\theta_r$ as the operation of the motor, with the following calculation formula:

$$f_{PWM}=f_0+m*\Delta f;$$

wherein $f_{PWM}$ is the carrier frequency in an actual operation of PWM, and m is a variation coefficient of the carrier frequency and its value range is 0, ±1, ±2 . . . ±n; as the motor rotates, linearly varying the value of m as a increasing of the number of the periods; when m takes the maximum value n or the minimum value −n, reversely and linearly varying;

3) based on a comparison of a mechanical angle corresponding to one period of the actually controlled switched reluctance motor and a mechanical rotating angle by the rotor, determining whether the motor enters a new period; if the new period is entered, updating the PWM carrier frequency in a specific way of varying: on the assumption of first having the PWM carrier frequency increase with the increasing of the motor periods, increasing the PWM carrier frequency by one frequency unit offset amount $\Delta f$ based on the current PWM carrier frequency, when the PWM carrier frequency increases to the maximum value ($f_0 \pm n*\Delta f$), decreasing the PWM carrier frequency as the motor period increases and the value of each decrease is also one frequency unit offset amount $\Delta f$, until decreasing to the minimum value ($f_0 − n*\Delta f$), and increasing the PWM carrier frequency again as the motor period increases, thus cycling. If the motor has not entered the new period, keeping the PWM carrier frequency unchanged;

4) outputting, by the microprocessor, the PWM signal with the calculated carrier frequency and the duty ratio as the driving signal, to the power converter of the asymmetric half-bridge circuit structure; on the basis of an operation result of a control program, outputting corresponding switching signals of upper and lower power tubes, where a switched control signal of the upper power tube is the PWM signal output and modulated by the microprocessor, and a control signal of the lower power tube is a switching control signal without PWM and output directly by the microprocessor.

3. The method for reducing noise of a switched reluctance motor based on adjusting a PWM carrier frequency of claim 1, wherein a microprocessor MCU uses a STM32F103B as a main control chip, a phase current sample of the motor uses a constantan wire as a sampling resistance, and a detection of a motor rotor position uses a pulse type HALL sensor US4881UA.

4. One or more non transitory non-volatile readable storage media storing computer readable instructions, wherein when the computer readable instructions are executed by one or more processors, the one or more processors are caused to perform the steps of the method of claim 1.

5. A method for reducing noise of a switched reluctance motor, comprising:

supplying a PWM signal as a driving signal to a driving circuit of the switched reluctance motor; and varying a carrier frequency of the PWM signal as an operation period of the switched reluctance motor varies; wherein if the switched reluctance motor changes phase, determining that the operation period of the switched reluctance motor has varied;

wherein as the operation period of the switched reluctance motor varies, linearly varying the carrier frequency of the PWM signal.

6. The method of claim 5, wherein the step of supplying the PWM signal as the driving signal to the driving circuit of the switched reluctance motor comprising supplying the PWM signal with an initial carrier frequency to the driving circuit of the switched reluctance motor;

the step of varying the carrier frequency of the PWM signal as the operation period of the switched reluctance motor varies comprising: if an offset amount of the carrier frequency of the PWM signal offset from the initial carrier frequency is detected to reach a preset maximum offset amount, varying, in a way of reversely linearly varying, the carrier frequency of the PWM signal in the subsequent operation period.

7. The method of claim 6, wherein the step of varying the carrier frequency of the PWM signal as the operation period of the switched reluctance motor varies comprising: keeping a duty ratio of the PWM signal unchanged, and as the operation period of the switched reluctance motor varies, varying the carrier frequency of the PWM signal.

8. The method of claim 5, wherein the step of varying the PWM carrier frequency of the driving signal over time comprising:

after detecting that the switched reluctance motor has completed one operation period, determining that the switched reluctance motor enters a next operation period, and varying the carrier frequency of the PWM signal in the next operation period.

9. The method of claim 8, further comprising: if the switched reluctance motor has not entered into the new operation period, keeping the carrier frequency of the PWM signal unchanged.

10. The method of claim 5, wherein the step of determining that the switched reluctance motor changes phase comprising: if an axis of one stator salient pole of the switched reluctance motor is changed from coinciding with an axis of one rotor salient pole to coinciding with a next axis of one rotor salient pole, determining that the switched reluctance motor changes phase.

11. The method of claim 10, further comprising a step of: based on the number of a rotor salient poles of the switched reluctance motor, calculating that when the switched reluctance motor completes one operation period, a reference angle to be rotated accordingly by the rotor of the switched reluctance motor;

the step of if the axis of one stator salient pole of the switched reluctance motor is changed from coinciding with the axis of one rotor salient pole to coinciding with the next axis of one rotor salient pole, determining that the operation period of the switched reluctance motor changes, comprising: if detecting that the axis of one salient pole of the switched reluctance motor coincides with the axis of one rotor salient pole, afterwards detecting that a rotating angle of the rotor of the switched reluctance motor reaches the reference angle as the switched reluctance motor continues operating, then determining that the switched reluctance motor enters a new operation period.

12. The method of claim 5, wherein the driving circuit of the switched reluctance motor comprises: more than two asymmetric half-bridge circuits; each phase winding of the switched reluctance motor is powered by a corresponding asymmetric half-bridge circuit; each asymmetric half-bridge circuit comprises a first power tube, a second power tube, a first freewheel diode and a second freewheel diode; a power supply end of the first power tube and a cathode of the second freewheel diode are both connected to an positive of a power supply, an output end of the second power tube and an anode of the first freewheel diode are both connected to an negative of the power supply, an output end of the first power tube is connected to a cathode of the first freewheel diode, and an anode of the second freewheel diode is connected to the power supply end of the second power tube; and the step of supplying the PWM signal as a driving signal to the driving circuit of the switched reluctance motor comprises: supplying the PWM signal to a control end of each of the first power tube.

13. The method of claim 5, further comprising:
obtaining a speed-adjusting signal of a speed-adjusting handle of the switched reluctance motor, a gear signal of a gear switch of the switched reluctance motor, a phase current signal of the switched reluctance motor, and a rotor position signal of the switched reluctance motor; and
based on the speed-adjusting signal and the gear signal, determining a duty ratio of the PWM signal, and based on the phase current signal of the switched reluctance motor, compensating the PWM signal; and based on the rotor position signal of the switched reluctance motor, calculating the carrier frequency of the PWM signal;
the step of varying the carrier frequency of the PWM signal is varying the carrier frequency of the PWM signal according to the calculated carrier frequency.

14. One or more non transitory non-volatile readable storage media storing computer readable instructions, wherein when the computer readable instructions are executed by one or more processors, the one or more processors are caused to perform the steps of the method of claim 5.

15. A control system for a switched reluctance motor, comprising:
a driving circuit configured for driving the switched reluctance motor;
a microprocessor connected to the driving circuit, and configured for supplying a PWM signal as a driving signal to the driving circuit, varying a carrier frequency of the PWM signal as an operation period of the switched reluctance motor varies, and if the switched reluctance motor changes phase, determining that the operation period of the switched reluctance motor has varied;
a HALL sensor configured to detect a rotor position signal of the switched reluctance motor;
a sampling resistance connected to an input end of the switched reluctance motor; and
a signal processing circuit connected to a speed-adjusting handle of the switched reluctance motor and a gear switch; the signal processing circuit further being connected to the HALL sensor and the sampling resistance, respectively; the signal processing circuit being configured for sampling a phase current signal of the switched reluctance motor through the sampling resistance, determining a duty ratio of the PWM signal based on the speed-adjusting signal and a gear signal, compensating the PWM signal based on the phase current signal, calculating a carrier frequency of the PWM signal based on the rotor position signal, and varying carrier frequency of the PWM signal based on the calculated carrier frequency.

16. The control system of claim 15, wherein
the driving circuit of the switched reluctance motor comprises more than two asymmetric half-bridge circuits; each phase winding of the switched reluctance motor is powered by a corresponding asymmetric half-bridge circuit; each of the asymmetric half-bridge circuits comprises a first power tube, a second power tube, a first freewheel diode and a second freewheel diode; a power supply end of the first power tube and a cathode of the second freewheel diode are both connected to a positive of a power supply, an output end of the second power tube and an anode of the first freewheel diode are both connected to a negative of the power supply, an output end of the first power tube is connected to a cathode of the first freewheel diode, and an anode of the second freewheel diode is connected to a power supply end of the second power tube; and
the microprocessor is configured to supply the PWM signal to a control end of each first power tube.

17. The control system of claim 16, wherein the HALL sensor is a pulse type HALL sensor.

* * * * *

UNITED STATES PATENT AND TRADEMARK OFFICE
CERTIFICATE OF CORRECTION

PATENT NO. : 11,336,217 B2
APPLICATION NO. : 16/958868
DATED : May 17, 2022
INVENTOR(S) : Rui Zhong et al.

It is certified that error appears in the above-identified patent and that said Letters Patent is hereby corrected as shown below:

In the Claims

Claim 17, Column 16, Line 59, "sensor is a pulse type HALL sensor." should be – sensor is a pulsetype HALL sensor. –

Signed and Sealed this
Fifteenth Day of November, 2022

Katherine Kelly Vidal
*Director of the United States Patent and Trademark Office*